US009400850B2

(12) United States Patent
Roberts et al.

(10) Patent No.: US 9,400,850 B2
(45) Date of Patent: Jul. 26, 2016

(54) SYSTEMS AND METHODS FOR PROVIDING A TAILORED USER INTERFACE ASSOCIATED WITH A WEB PAGE

(75) Inventors: Brian F. Roberts, Dallas, TX (US); Armando P. Stettner, Westford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 248 days.

(21) Appl. No.: 13/149,324

(22) Filed: May 31, 2011

(65) Prior Publication Data

US 2012/0311470 A1    Dec. 6, 2012

(51) Int. Cl.
 G06F 17/30 (2006.01)
 H04N 5/44 (2011.01)

(52) U.S. Cl.
 CPC ........ *G06F 17/30893* (2013.01); *H04N 5/4403* (2013.01)

(58) Field of Classification Search
 CPC ............ H04N 21/431; H04N 21/8543; H04N 5/4403; G06F 17/30905; G06F 3/0482; G06F 17/2235
 USPC .................................................. 715/763, 760
 See application file for complete search history.

(56) References Cited

U.S. PATENT DOCUMENTS

| | | | | |
|---|---|---|---|---|
| 6,034,689 A | * | 3/2000 | White ................... | G06F 3/0236 348/E5.002 |
| 6,226,642 B1 | * | 5/2001 | Beranek et al. ............... | 715/760 |
| 6,305,020 B1 | * | 10/2001 | Hoarty et al. ................... | 725/95 |
| 6,381,748 B1 | * | 4/2002 | Lin et al. ........................ | 725/109 |
| 6,747,591 B1 | * | 6/2004 | Lilleness et al. .............. | 341/176 |
| 6,772,394 B1 | * | 8/2004 | Kamada ......................... | 715/210 |
| 7,340,763 B1 | * | 3/2008 | Harris .............................. | 725/81 |
| 7,810,022 B2 | * | 10/2010 | Matsuda ....................... | 715/206 |
| 8,332,874 B2 | * | 12/2012 | Imai et al. ..................... | 719/320 |
| 8,413,057 B2 | * | 4/2013 | Choi et al. .................... | 715/740 |
| 8,429,537 B2 | * | 4/2013 | Choi et al. .................... | 715/740 |
| 8,527,861 B2 | * | 9/2013 | Mercer ......................... | 715/206 |
| 8,812,977 B2 | * | 8/2014 | Naderi ......................... | 715/787 |

(Continued)

FOREIGN PATENT DOCUMENTS

WO    WO 2008018049 A1 *    2/2008    ............... H04N 5/44

OTHER PUBLICATIONS

"Frames", from HTML 4.01 Specification, W3C Recommendation, @ http://www.w3.org/TR/html4/present/frames.html, Dec. 24, 1999.*

(Continued)

*Primary Examiner* — Jennifer To
*Assistant Examiner* — Joseph R Burwell

(57) ABSTRACT

Exemplary systems and methods for providing a tailored user interface associated with a web page are disclosed. An exemplary method includes a user interface computing system identifying, from computing code representative of a web page and based on a predefined element selection heuristic, one or more select elements of the web page and generating a user interface including data representative of the one or more select elements for display on a display screen, the user interface having a presentation scheme that is different from a presentation scheme of the web page and that is tailored to facilitate interaction with the data representative of the one or more select elements by a user utilizing a set of user inputs. Corresponding systems and methods are also disclosed.

29 Claims, 11 Drawing Sheets

(56) References Cited

U.S. PATENT DOCUMENTS

| | | | |
|---|---|---|---|
| 2002/0092028 A1* | 7/2002 | Lin et al. | 725/93 |
| 2002/0170066 A1* | 11/2002 | Liu | 725/109 |
| 2002/0184351 A1* | 12/2002 | Istvan et al. | 725/152 |
| 2002/0199190 A1* | 12/2002 | Su | 725/37 |
| 2003/0145325 A1* | 7/2003 | Finster et al. | 725/46 |
| 2003/0229900 A1* | 12/2003 | Reisman | 725/87 |
| 2004/0133855 A1* | 7/2004 | Blair et al. | 715/517 |
| 2004/0233052 A1* | 11/2004 | Uchigaki et al. | 340/525 |
| 2004/0261131 A1* | 12/2004 | Zigmond et al. | 725/136 |
| 2005/0005302 A1* | 1/2005 | Zigmond et al. | 725/109 |
| 2005/0080496 A1* | 4/2005 | Hayes | G06F 1/1626 700/65 |
| 2005/0149878 A1* | 7/2005 | White et al. | 715/784 |
| 2005/0155074 A1* | 7/2005 | Futawatari | 725/100 |
| 2005/0268214 A1* | 12/2005 | Lu | 715/501.1 |
| 2006/0068919 A1* | 3/2006 | Gottfurcht | 463/42 |
| 2007/0279431 A1* | 12/2007 | Matsuda | 345/594 |
| 2009/0044098 A1* | 2/2009 | Wyler | H04L 67/42 715/234 |
| 2009/0089667 A1* | 4/2009 | Wood et al. | 715/273 |
| 2009/0119598 A1* | 5/2009 | Oztaskent | 715/733 |
| 2009/0227279 A1* | 9/2009 | Yuki et al. | 455/550.1 |
| 2010/0107054 A1* | 4/2010 | Park | G06F 3/04842 715/234 |
| 2010/0107203 A1* | 4/2010 | McCarthy et al. | 715/760 |
| 2010/0146544 A1* | 6/2010 | Aoki et al. | 725/37 |
| 2010/0162312 A1* | 6/2010 | Heilbron et al. | 715/760 |
| 2010/0223549 A1* | 9/2010 | Edwards | 715/708 |
| 2010/0245681 A1* | 9/2010 | Harris | 348/734 |
| 2011/0113353 A1* | 5/2011 | Koh et al. | 715/760 |
| 2011/0196752 A1* | 8/2011 | Paulik et al. | 715/760 |
| 2011/0289419 A1* | 11/2011 | Yu et al. | 715/760 |
| 2011/0289435 A1* | 11/2011 | Kim et al. | 715/760 |
| 2011/0289436 A1* | 11/2011 | Choi et al. | 715/760 |
| 2012/0023532 A1* | 1/2012 | Wong et al. | 715/760 |
| 2012/0166974 A1* | 6/2012 | Elford et al. | 715/760 |

OTHER PUBLICATIONS

"H30: Providing link text that describes the purpose of a link for anchor elements", from Techniques for WCAG 2.0, Techniques and Failures for Web Content Accessibility Guidelines 2.0, W3C Working Group Note, @ http://www.w3.org/TR/2010/NOTE-WCAG20-TECHS-20101014/H30.html, Oct. 14, 2010.*

* cited by examiner

SYSTEMS AND METHODS FOR PROVIDING A TAILORED USER INTERFACE ASSOCIATED WITH A WEB PAGE

BACKGROUND INFORMATION

Certain media content access devices are not configured, or at least not well configured, for use in accessing and/or facilitating user interaction with traditional websites. To illustrate, set-top box devices used to access television programming distributed by a subscription television service provider are not equipped to access and/or to support user-friendly interaction with traditional websites. Thus, providers of such set-top box devices face a dilemma when attempting to provide users of the devices with access to web content.

One solution is to configure a set-top box device to access only websites that have been customized by the operators of the websites for access by set-top box devices. However, this solution requires each website operator to create and maintain a website that is customized specifically for access by set-top box devices, which customization increases the burden on the website operator and significantly limits the amount of web content that can be accessed by the set-top box device.

Another solution is to install a conventional web browser on a set-top box device. With a web browser installed, the set-top box device may be able to access and present traditional websites. However, this creates a challenge in providing an acceptable user experience. For example, traditional websites are typically configured for interaction by a user utilizing a conventional computer mouse but not for interaction by a user utilizing a set-top box remote control device. Consequently, a traditional website presented by a set-top box device is not easily or intuitively navigable by a user utilizing a set-top box remote control device to interact with the website.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for providing a tailored user interface associated with a web page are described herein. In certain examples, a user interface computing system may identify, from computing code representative of a web page and based on a predefined element selection heuristic, one or more select elements included in the web page and generate a user interface including data representative of the one or more select elements for display on a display screen. The generated user interface includes a presentation scheme that is different from a presentation scheme of the web page and that is tailored to facilitate interaction with the data representative of the one or more select elements by a user utilizing a particular set of user inputs. In some examples, each of the one or more select elements in the tailored user interface may be configured to function as a user-selectable shortcut to content associated with the web page. Accordingly, a user may interact with the data representative of the one or more select elements in the tailored user interface in order to access content associated with the web page, without the user having to interact directly with the actual web page in order to access the content associated with the web page. By interacting with the tailored user interface instead of the actual web page, a user utilizing a particular set of user inputs is more likely to enjoy a user-friendly experience than the user would be if he or she were utilizing the same particular set of user inputs to interact directly with the actual web page. Exemplary systems and methods for providing a tailored user interface associated with a web page will now be described in reference to the drawings.

Figure 1:
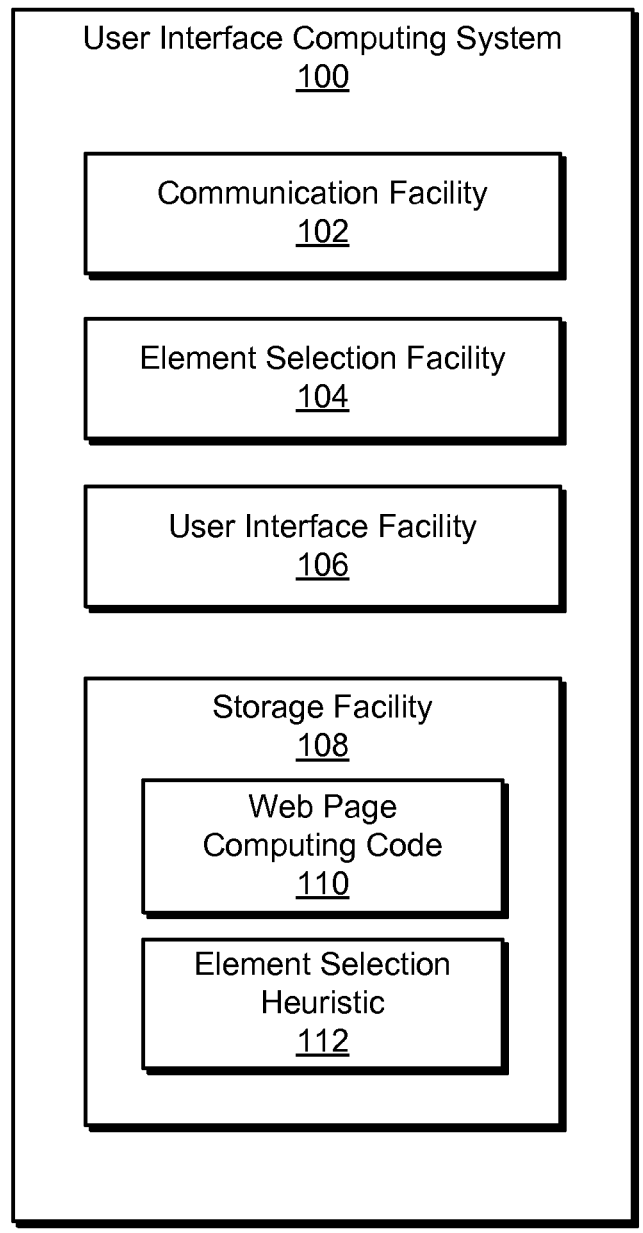
FIG. 1 illustrates an exemplary user interface computing system according to principles described herein.

FIG. 1 illustrates an exemplary user interface computing system 100 (or simply "system 100"). As shown, system 100 may include, without limitation, a communication facility 102, an element selection facility 104, a user interface facility 106, and a storage facility 108 selectively and communicatively coupled to one another. Any suitable communication technologies, including any of the communication technologies mentioned herein, may be employed to facilitate communications between facilities 102-108. Each of these facilities will now be described in more detail.

Communication facility 102 may be configured to facilitate communications between computing devices, including any of the exemplary computing devices disclosed herein, using any communication technologies suitable to support the functionality of system 100 described herein. Examples of communication protocols and/or technologies that may be employed by communication facility 102 include, without limitation, local area network communication protocols and/or technologies (e.g., IEEE 802.11 and/or Ethernet based communications), wide area network communication protocols and/or technologies, Transmission Control Protocol ("TCP"), Internet Protocol ("IP"), Hypertext Transfer Protocol ("HTTP"), Secure Hypertext Transfer Protocol ("HTTPS"), any suitable Internet-based communication protocols and/or technologies, and any combination or sub-combination thereof.

Through communication facility 102, system 100 may access computing code representative of a web page, such as by accessing web page computing code from a web server device. For example, communication facility 102 may be configured to communicate with a web server device and request and receive computing code representative of a web page from the web server device (e.g., via an HTTP or HTTPS session). Computing code representative of a web page that is accessed and/or accessible by system 100 is represented as web page computing code 110 in FIG. 1.

Web page computing code 110 may include any computer-readable code configured to be processed by a computing device to generate a web page. For example, web page computing code 110 may include markup language code (e.g., Hypertext Markup Language ("HTML") code, Extensible Markup Language ("XML"), Extensible Hypertext Markup Language ("XHTML"), etc.), Lua, Enhanced Binary Interchange Format ("EBIF"), one or more script objects, and/or other form of computing code configured to be processed by a computing device (e.g., by a web browser application running on a computing device) to generate the web page for presentation.

Element selection facility 104 may be configured to identify, from web page computing code 110, one or more select elements of the web page represented by the web page computing code 110. A process of identifying one or more select elements of the web page may include element selection facility 104 parsing web page computing code 110 to detect elements included in and/or otherwise associated with the web page. The parsing may be performed in any way suitable for detecting elements of a web page.

Elements of a web page may include, without limitation, content of the web page (e.g., text, graphics, images, video, audio, and any other content that may be included in the web page), attributes of web page content, tags associated with web page content, anchors to content not included in the web page (e.g., hyperlinks to other web pages, media content, etc.), embedded media players (e.g., a Flash player), script objects (e.g., Javascript objects), and/or any other components that may be included in a web page. For a web page represented by HTML code, for example, the HTML code may include elements such as structural markup elements that indicate layout structure and/or purpose of web page content, presentational markup elements that indicate appearance of web page content, cascading style sheets ("CSS") that indicate styles and/or other presentation attributes for web page content, content elements that include web content, and anchor elements that form hyperlinks to other content not included in the web page. An exemplary element of a web page represented by HTML code may include a pair of tags (e.g., a start tag and an end tag) with web page content, attributes, and/or other elements disposed between the pair of tags.

Together, the elements of a web page define the web page such that when web page computing code 110 representative of the web page is processed by a web browser application running on a computing device, the web browser application is able to generate and provide the web page for display on a display screen in accordance with a presentation scheme defined by the elements of the web page. The presentation scheme of the web page may include a set of presentation properties defined by the elements of the web page that dictates the overall presentation structure and/or appearance of the web page. The presentation properties may include structural, appearance, style, and/or other properties of the web page. Hence, the web page may be displayed in accordance with structural, appearance, style, and/or other properties specified in the web page computing code 110.

From the detected elements of the web page, element selection facility 104 may select, based on a predefined element selection heuristic 112 ("heuristic 112"), one or more of the elements of the web page for inclusion in a tailored user interface. To this end, heuristic 112 may include data specifying defined conditions configured to be used by element selection facility 104 to determine which elements of the web page to select for inclusion in the tailored user interface. The conditions specified in heuristic 112, which may be defined by content providers, service providers, an end user, or a combination or sub-combination thereof, may include any conditions as may suit a particular implementation.

To illustrate, heuristic 112 may specify that certain types of web page elements are to be selected for inclusion in a tailored user interface. For example, heuristic 112 may specify that interactive elements of a web page (e.g., elements such as hyperlinks, navigation buttons, etc. that may be selected by a user) are to be selected by element selection heuristic 104 for inclusion in the tailored user interface. In some examples, heuristic 112 may more specifically specify one or more subtypes of interactive elements that are to be selected by element selection facility 104 for inclusion in the tailored user interface. Examples of subtypes of interactive elements include, without limitation, navigational elements (e.g., elements that may be selected by a user to access other web pages such as other web pages associated with the same website), media content link elements (e.g., elements that may be selected by a user to access media content linked to the elements), embedded media player elements, and any other types of interactive elements of a web page. In some examples, heuristic 112 may more specifically specify subtypes of navigational elements to be selected for inclusion in the user interface. Examples of such subtypes include, without limitation, primary navigational elements (e.g., persistent navigational buttons of a website that provide links between primary web pages of the website) and other non-primary navigational elements (e.g., text hyperlinks to other web pages).

Regardless of the specific type or types of web page elements specified by heuristic 112, element selection facility 104 may be configured to select the types or types of web page elements specified by heuristic 112 for inclusion in the user interface. The selection of the specified type or types of web page elements may be accomplished in any suitable way. For example, element selection facility 104 may use element tags, element attributes, element identifiers, style sheets, and/or any other information included in web page computing code 110 to determine and select the type or types of web page elements that match the conditions specified in heuristic 112. As another example, element selection facility 104 may be configured to follow links included in web page computing code 110 to determine the type or types of the link elements based on the content to which the link elements are directed. To illustrate, element selection facility 104 may follow a link to determine whether the linked content includes media content, another web page, or some other content. Based on this determination, element selection facility 104 may categorize the link element as being a particular type of element.

Selection of web page elements by element type is illustrative of one exemplary basis that may be used to select web page elements. Element selection facility 104 may similarly select certain elements of the web page for inclusion in a tailored user interface based on other conditions specified in heuristic 112.

User interface facility 106 may be configured to generate a tailored user interface that includes data representative of one or more web page elements selected by element selection facility 104 as described above. User interface facility 106 may be configured to generate the tailored user interface in any suitable way. For example, user interface facility 106 may receive data representative of the selected web page elements from element selection facility 104 and insert the data representative of the selected web page elements into a predefined user interface template to generate the tailored user interface for display on a display screen.

A user may interact with the tailored user interface to access the select elements of the web page represented in the tailored user interface. The data representative of the select web page elements included in the tailored user interface may provide access to the select web page elements in any suitable way. For example, the data representative of the select web page elements included in the tailored user interface may be configured to function as shortcuts to the select elements included in the web page and/or to content associated with the select elements included in the web page. Alternatively, the data representative of the select web page elements included in the tailored user interface may include graphical and/or functional copies of the select elements included in the web page. Accordingly, when a user selects data representative of a select web page element included in the tailored user interface, access to the web page element and/or content associated with the web page element is provided. From the perspective of the user, the access is provided just as it would be if the user interacted directly with the actual web page to select the web page element. However, because the user interface is tailored, interaction with the user interface to select data representative of a select web page element may be easier and more intuitive to the user than direct interaction with the actual web page to select the web page element.

The user interface generated by user interface facility 106 is tailored in that it is configured to facilitate easy, convenient, and/or intuitive interaction with the user interface by a user utilizing a particular set of user inputs that would not provide the user with as easy, convenient, and/or intuitive interaction if used to interact directly with the actual web page with which the user interface is associated. Hence, the tailored user interface may be configured to facilitate an interactive experience that is more user-friendly than the user would experience if trying to use the same set of user inputs to interact directly with the actual web page with which the tailored user interface is associated.

In certain examples, the user interface generated by user interface facility 106 includes a presentation scheme that is different from the presentation scheme of the web page. For example, the data representative of the select elements included in the user interface may be organized in accordance with the presentation scheme of the user interface rather than in accordance with the presentation scheme of the web page. The presentation scheme of the user interface may include structural (e.g., layout of graphical elements, spacing between graphical elements, navigation path between graphical elements, etc.), appearance, style, and/or other properties of the user interface that dictate how the graphical data representative of the select web page elements is displayed within the user interface. The presentation scheme of the user interface may omit, replace, and/or alter any of the structural, appearance, style, and/or other properties of the presentation scheme of the web page.

The presentation scheme of the user interface generated by user interface facility 106 may be tailored to facilitate interaction with the data representative of the one or more select elements included in the user interface by a user utilizing a set of user inputs. For example, the data representative of the one or more select elements may be organized within user interface in accordance with a structure that is configured to facilitate user interaction based on the set of user inputs. For instance, the data representative of the one or more select elements included in the user interface may have a layout, spacing, and/or navigation path that are different from that of the associated web page and that facilitate interaction based on the set of user inputs. Examples of tailored user interfaces and corresponding sets of user inputs are described in detail below.

Storage facility 108 may be configured to store data representative of web page computing code 110 and heuristic 112, which will be described in detail below. Storage facility 108 may store additional or alternative data as may serve a particular implementation of system 100.

Figure 2:
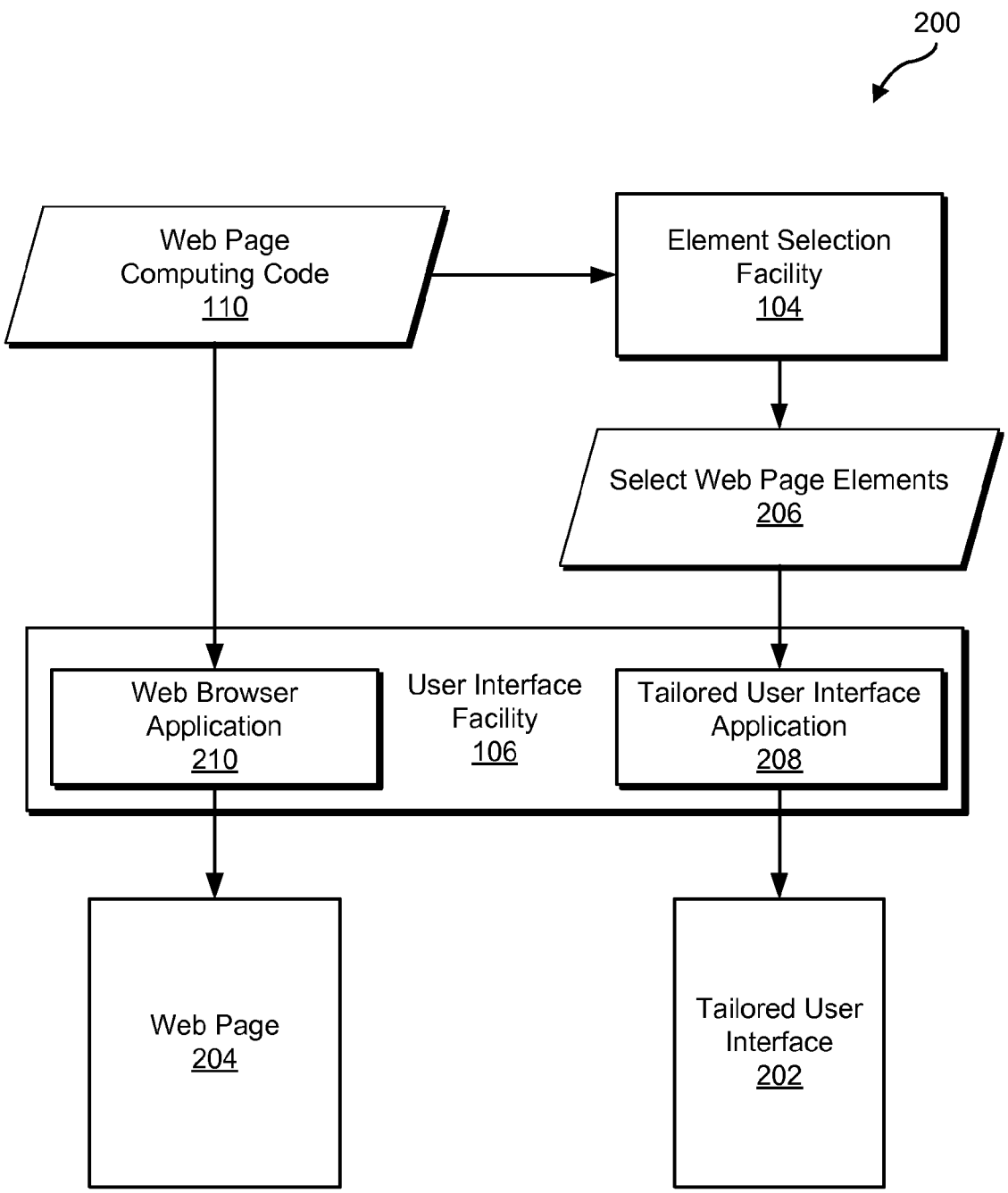
FIG. 2 illustrates an exemplary process flow for providing a tailored user interface associated with a web page to principles described herein.

FIG. 2 illustrates an exemplary process flow 200 for providing a tailored user interface 202 associated with a web page 204. As shown, element selection facility 104 may access and use web page computing code 110 to identify one or more select elements 206 of the web page 204 represented by web page computing code 110. User interface facility 106 may access and use the one or more select elements 206 to generate tailored user interface 202. More specifically, a tailored user interface application 208 included in user interface facility 106 may access and use the one or more select elements 206 to generate tailored user interface 202.

In some examples, a web browser application 210, which may be included in user interface facility 106 as shown in FIG. 2 or separate from user interface facility 106 in other implementations, may access and use web page computing code 110 to generate the web page 204 represented by the web page computing code 110. The generated web page 204 may include all of the web page elements defined by web page computing code such that when displayed the web page 204 is displayed in accordance with the presentation scheme of the web page 204.

Figure 3:
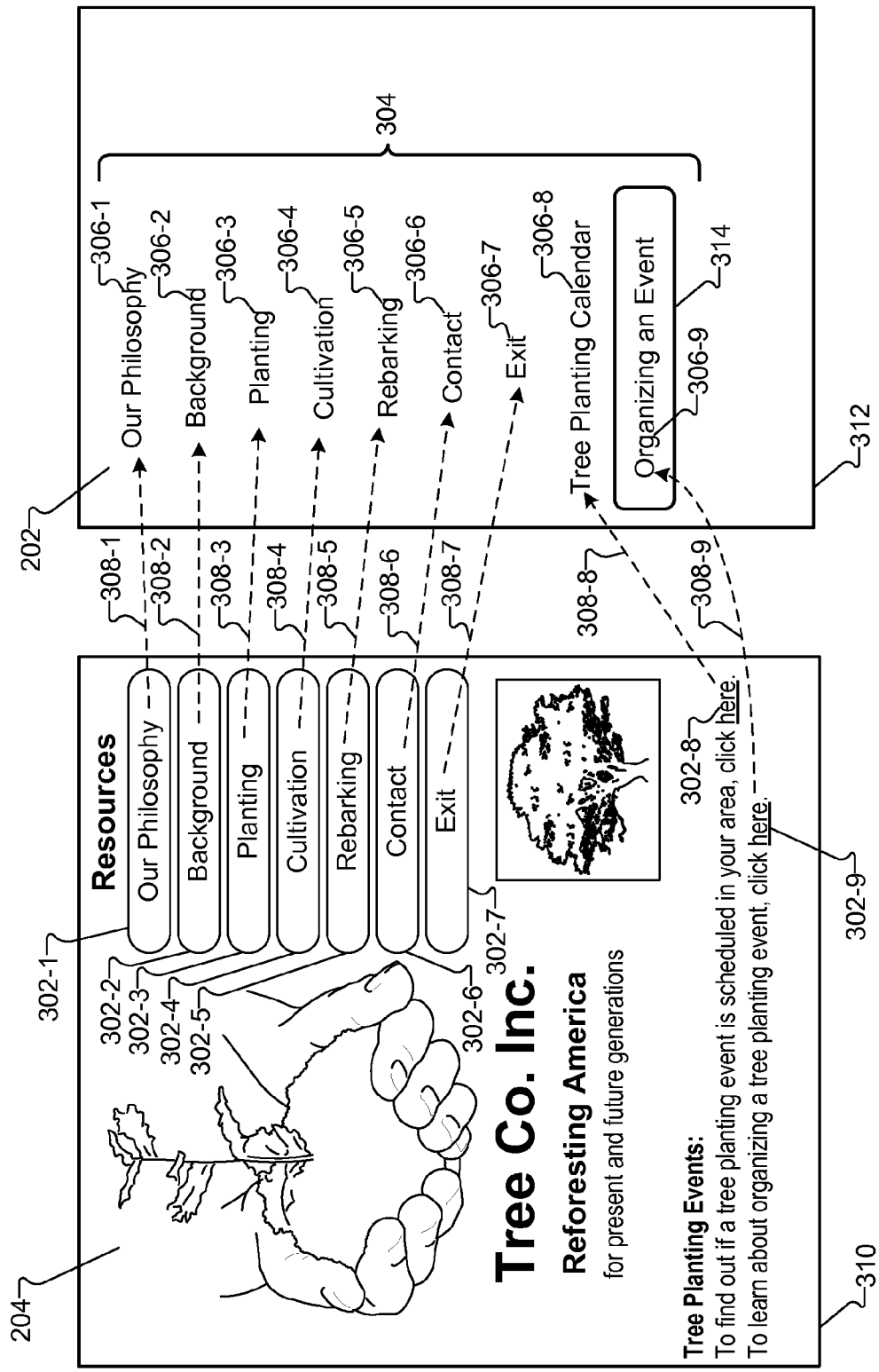
FIG. 3 illustrates examples of a tailored user interface and an associated web page according to principles described herein.

FIG. 3 illustrates examples of web page 204 and tailored user interface 202 associated with web page 204. As shown, web page 204 may include web page elements in the form of images, text, headings, navigation buttons, and text hyperlinks organized into a page layout as defined by a presentation scheme of web page 204. Certain elements of web page 204 shown in FIG. 3 are interactive elements. For example, elements 302-1 through 302-9 (collectively "interactive elements 302") are selectable by a user interacting with web page 204. The particular web page 204 shown in FIG. 3 is illustrative only. The principles described herein are applicable to other web pages.

Tailored user interface 202 may be generated as described above and may include data representative of one or more select elements of web page 204. In the example illustrated in FIG. 3, for example, tailored user interface 202 includes graphical data 304 representative of interactive elements 302 of web page 204. The graphical data 304 may be in any suitable form. In FIG. 3, for example, the graphical data 304 includes text representative of interactive elements 302. The text used to represent interactive elements 302 may be determined in any suitable way, including by element selection facility 104 accessing tags, text strings, Uniform Resource Locators ("URLs"), or other information from web page computing code 110 and/or by element selection facility 104 following links to determine information about linked content and select appropriate textual descriptors based on the information. To illustrate, in certain examples, textual descriptors to be used for interactive elements 302-1 through 302-7 may be determined from text strings associated with the interactive elements 302-1 through 302-7 and included in web page computing code 110. In addition, text descriptors to be used for interactive elements 302-8 and 302-9 may be determined from URLs associated with interactive elements 302-8 and 302-9 and/or from titles of other web pages associated with the URLs.

While FIG. 3 illustrates tailored user interface 202 to include graphical data 304 in the form of text, this is illustrative only. Additional or alternative forms of graphical data 304 may be displayed in other embodiments. In certain embodiments, for example, user interface facility 106 may be configured to copy graphics and/or other content from web page 204 for inclusion in tailored user interface 202. For instance, graphical data 304 may include copies of interactive elements 302 such that the graphical data 304 displayed in tailored user interface 202 includes graphical and/or functional duplicates of the interactive elements 302 of web page 204. This may allow tailored user interface 202 to mimic the appearance and/or functionality of the interactive elements 302 in web page 204.

Tailored user interface 202 may be configured to facilitate user interaction with data representative of select web page elements included in tailored user interface 202. For example, graphical data 304 may be organized into a menu of selectable options corresponding to the interactive elements 302 in accordance with a presentation scheme of tailored user interface 202. In FIG. 3, for instance, graphical data 304 includes a vertical, linear list of selectable menu options 306-1 through 306-9 (collectively "selectable menu options 306") corresponding to interactive elements 302-1 through 302-9, respectively. Dashed arrows 308-1 through 308-9 shown in FIG. 3 represent associations between the interactive elements 302 in web page 204 and the corresponding selectable menu options 306 in tailored user interface 202.

Selectable menu options 306 in tailored user interface 202 may be selected by a user to access corresponding interactive elements 302 of web page 204 and/or content associated with interactive elements 302 of web page 204. Accordingly, selectable menu options 306 may function as shortcuts to interactive elements 302 and/or content associated with interactive elements 302. The shortcuts allow a user to intuitively interact with tailored user interface 202 to gain access to interactive elements 302 of web page 204 and/or content associated with interactive elements 302 of web page 204 without having to directly interact with web page 204 (e.g., without directly selecting interactive elements 302 displayed in web page 204).

In response to a detection of a user selection of a selectable menu option 306 in tailored user interface 202, user interface facility 106 and/or communication facility 102 may access content associated with the interactive element 302 corresponding to the selected menu option 306. The accessed content may include any content that may be associated with an element of a web page, including, without limitation, another web page, media content, and/or other web content.

In some examples, tailored user interface 202 may be provided to a display device for display together with web page 204 on a display screen. In such examples, tailored user interface 202 may function as a companion interface to web page 204. Accordingly, a user may be able to concurrently view web page 204 and tailored user interface 202.

To illustrate, web page 204 may be displayed in a first presentation window 310 and tailored user interface 202 may be concurrently displayed in a second presentation window 312 on a display screen. The user may interact with tailored user interface 204 to provide input to control the content displayed in first presentation window 310. In response to the content in first presentation window 310 changing based on user interaction with tailored user interface 202, the content in second presentation window 312 may be changed. For example, another web page may be displayed in first presentation window 310 in response to a user selecting a menu option 306 in tailored user interface 202, and a new tailored user interface associated with the other web page may be dynamically generated as described above and displayed in second presentation window 312.

The presentation of tailored user interface 202 adjacent one side of web page 204 as shown in FIG. 3 is illustrative only. Other presentations of tailored user interface 202 may be provided in other embodiments. For example, tailored user interface 202 may be displayed adjacent another side of web page 204. As another example, tailored user interface 202 may be displayed around web page 204, which may allow web page 204 to occupy a central area of a display screen while tailored user interface 202 occupies peripheral areas of the display screen. As another example, tailored user interface 202 may be presented as an overlay to web page 204.

In other examples, tailored user interface 202 may be presented as a substitute for web page 204. This may allow for omission of a conventional web browser application from a content access device, which may help conserve computing device resources. Even without a conventional web browser application installed on a content access device, a user of the content access device may access and interact with elements of a web page through tailored user interface 202. When the actual web page 204 is not presented, tailored user interface 202 may be configured to include interactive elements and other elements of the web page 204 (e.g., web page titles, headings, text, etc.) to help improve a user's experience interacting with tailored user interface 202 without viewing the actual web page 204.

Tailored user interface 202 may be presented persistently on a display screen and/or in response to any predefined trigger event. For example, tailored user interface 202 may be generated in response to a parsing of web page computing code 110 by a web browser application, detection of user input requesting the tailored user interface 202 (e.g., by the user providing a predetermined user input such as a pinch gesture on a touch screen), or any other suitable trigger event.

As mentioned, tailored user interface 202 is tailored to facilitate easy, convenient, and/or intuitive interaction by a user utilizing a particular set of user inputs that would not provide the user with as easy, convenient, and/or intuitive interaction if used to interact directly with web page 204. To illustrate, web page 204 may be designed for interaction by a user utilizing a set of user inputs supported by a computer mouse. This set of user inputs allows the user to move a cursor icon on a display screen to interact with elements of the web page 204. Other sets of user inputs, however, are not as well suited for use in interacting directly with web page 204. For example, a set of user inputs may include directional arrow buttons (e.g., left, right, up, and down arrow buttons) and a selection button that together make up a "directional pad" that may be included on a user input device such as a remote control device associated with a content access device (e.g., a television, DVR, or set-top box device). Such a directional pad set of user inputs is not well suited for interacting with web page 204. For instance, if a user wants to select web page element 302-8 of web page 204, this selection is not intuitive, easy, or convenient for the user utilizing a directional pad set of user inputs. The user may have to arrow through various elements of web page 204 in an indirect and/or trial-and-error manner in order to find an arrow path to the desired web page element 302-8.

In contrast, tailored user interface 202 may be configured to facilitate easy, convenient, and/or intuitive interaction by a user utilizing a directional pad set of user inputs. For example, tailored user interface 202 shown in FIG. 3 includes a vertical, linear list of selectable menu options 306, which linear list provides an intuitive, easy, and convenient way for a user to utilize directional pad user inputs to arrow to and select a desired option (e.g., selectable menu option 306-8 associated with web page element 302-8) without have to guess or employ a trial-and-error methodology to find a path to the desired option. The user may select an up arrow button or a down arrow button to move a selector 314 up or down the list of selectable menu options 306 until the selector 314 is positioned on a desired option, which may then be selected by the user actuating a selection button. In addition to providing a more direct and/or intuitive path to a desired option, the path to the desired option may be shorter in tailored user interface 202 than in web page 204 at least because tailored user interface 202 may include data representative of only a subset of the elements of web page 204. Hence, tailored user interface 202 may facilitate an easy, convenient, and/or intuitive interaction by a user utilizing a directional pad set of user inputs that would not provide the user with as easy, convenient, and/or intuitive interaction if used to interact directly with web page 204.

As another example, a set of user inputs may include touch screen user inputs that may be provided by a user touching a touch screen. For example, a user may touch an area of the touch screen to select a web page element displayed at the selected area of the touch screen. However, a conventional web page may be configured such that touch screen input is not always easy or convenient. To illustrate, a conventional web page may include selectable elements displayed so close to one another on the touch screen that a user may experience difficulty when attempting to select a desired one of the selectable elements without mistakenly selecting another of the selectable elements.

By comparison, tailored user interface 202 may be configured to facilitate easy, convenient, and/or intuitive interaction by a user utilizing a touch screen set of user inputs. For example, tailored user interface 202 shown in FIG. 3 includes a list of selectable menu options 306 associated with interactive elements 302 of web page 204. As illustrated in FIG. 3, tailored user interface 202 may include more screen space between the selectable menu options 306 than web page 204 includes between certain interactive elements 302 of web page 204. Accordingly, tailored user interface 202 may facilitate an easy and/or convenient interaction by a user utilizing a touch screen set of user inputs that would not provide the user with as easy and/or convenient interaction if used to interact directly with web page 204.

As yet another example, a set of user inputs may include spatial, visual, and/or other controller-less inputs that may be provided by a user performing one or more gestures that may be detected by one or more sensors. For example, one or more video cameras included in user interface facility 106 may capture video of a user acting out gestures. User interface facility 106 may analyze the video to detect the gestures and map the gestures to user inputs. A conventional web page may be configured such that spatial, visual, and/or other controller-less input is not always easy or convenient for interacting with the web page. By comparison, tailored user interface 202 may be configured to facilitate easy, convenient, and/or intuitive interaction by a user utilizing spatial, visual, and/or other controller-less sets of user inputs.

As compared to the actual web page 204, tailored user interface 202 may include one or more differences that help facilitate easy, convenient, and/or intuitive user interaction with tailored user interface 202. For example, as described above, tailored user interface 202 may include a presentation scheme that is different from a presentation scheme of web page 204. The presentation scheme of tailored user interface 202 may omit and/or alter structural, appearance, style, and/or other properties of web page 204. As another example, tailored user interface 202 may omit one or more elements of web page 204 such that tailored user interface 202 includes only a subset of the elements of web page 204.

Figure 4:
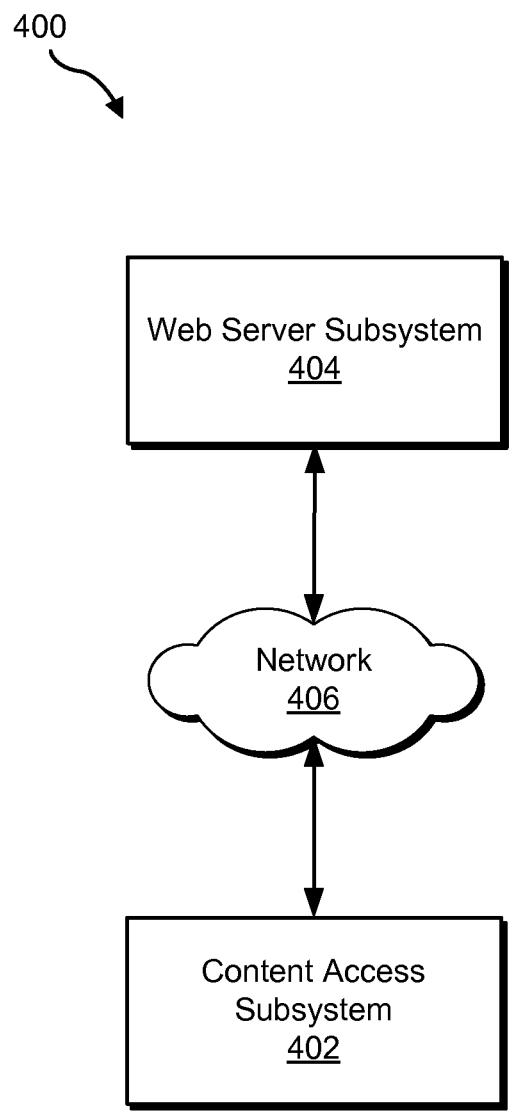
FIGS. 4-6 illustrate exemplary implementations of the system of FIG. 1 according to principles described herein.

System 100 may include or be implemented by one or more computing devices. FIG. 4 illustrates an exemplary implementation 400 of system 100. As shown in FIG. 4, implementation 400 may include a content access subsystem 402 configured to communicate with a web server subsystem 404 by way of a network 406. In implementation 400, any of facilities 102-108 of system 100 may be implemented by content access subsystem 402, web server subsystem 404, or distributed across content access subsystem 402 and web server subsystem 404.

Content access subsystem 402 and web server subsystem 404 may communicate using any communication platforms and technologies suitable for transporting data and/or communication signals, including any of the exemplary communication protocols and/or technologies disclosed herein. Network 406 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between content access subsystem 402 and web server subsystem 404. Communications between content access subsystem 402 and web server subsystem 404 may be transported using any one of the above-listed networks, or any combination or sub-combination of the above-listed networks. Alternatively, content access subsystem 402 and web server subsystem 404 may communicate in another way such as by one or more direct connections between content access subsystem 402 and web server subsystem 404.

Content access subsystem 402 may include one or more client and/or user computing devices configured to access web content from web server subsystem 404. For example, content access subsystem 402 may include, without limitation, a modem, a router, a set-top box device, a DVR device, a gaming console, a display device (e.g., a television, computer monitor, or integrated display device), a user input device (e.g., an infrared remote control device), a tablet computer, a laptop or other personal computer, a mobile phone, a smartphone, a media player device, or any combination or sub-combination thereof. In certain examples, content access subsystem 402 may request and receive web content from web server subsystem 404 by way of network 406 and present the web content for experiencing by a user associated with content access subsystem 402.

Web server subsystem 404 may include one or more computing devices (e.g., one or more web server devices) configured to store, maintain, and/or provide web content to content access subsystem 402. For example, web server subsystem 404 may be configured to provide web page computing code 110 representative of a web page to content access subsystem 402, which may receive and process the web page computing code 110 in any of the ways described herein. The processing may include content access subsystem 402 generating the web page from the web page computing code 110 and providing the web page to a display device for display on a display screen, as described above. The processing may additionally or alternatively include content access subsystem 402 identifying select elements of the web page from the web page computing code 110, generating a tailored user interface that includes data representative of the select elements, and providing the tailored user interface to a display device for display on a display screen, as described above.

Alternatively, or in combination with processing performed by content access subsystem 402, web server subsystem 404 may be configured to perform any or part of the processing to identify select elements of the web page from the web page computing code 110 and generate a tailored user interface that includes data representative of the select elements. Data generated from processing performed by the web server subsystem 404 may be provided to content access subsystem 402 for further processing. For example, the web server subsystem 404 may provide data representative of select elements of the web page to content access subsystem 402 for use by content access subsystem 402 in generating the tailored user interface, or, if web server subsystem 404 generates the tailored user interface, web server subsystem 404 may provide data representative of the tailored user interface to content access subsystem 402 for display by a display device on a display screen.

Figure 5:
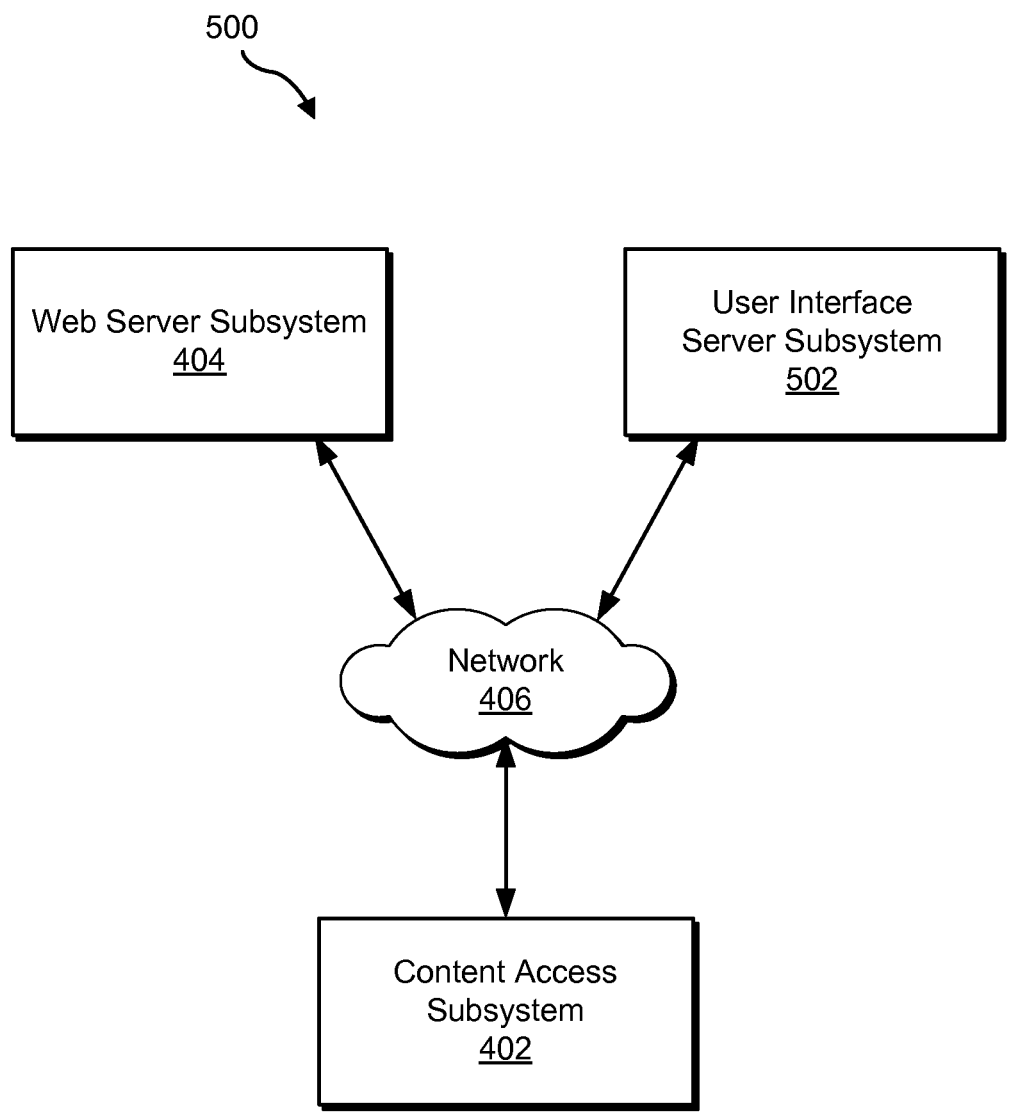

FIG. 5 illustrates another exemplary implementation 500 of system 100. As shown in FIG. 5, implementation 500 may include content access subsystem 402, web server subsystem 404, and a user interface server subsystem 502 configured to communicate with one another by way of network 406. In implementation 500, any of facilities 102-108 of system 100 may be implemented by content access subsystem 402, web server subsystem 404, user interface server subsystem 502, or distributed across the combination or a sub-combination of content access subsystem 402, web server subsystem 404, and user interface server subsystem 502.

In implementation 500, content access subsystem 402 and web server subsystem 404 may communicate as described above. In addition, user interface server subsystem 502 may communicate with content access subsystem 402 and/or web server subsystem 404 using any of the communication protocols and/or technologies disclosed herein.

Implementation 500 may be configured to operate similarly to implementation 400 except that certain processing may be offloaded from content access subsystem 402 and/or web server subsystem 404 to user interface server subsystem 502. For example, any of processing for identifying select elements of the web page from the web page computing code 110, generating a tailored user interface that includes data representative of the select elements, and providing the tailored user interface to a display device for display on a display screen may be performed, at least in part, by user interface server subsystem 502. Data generated from processing performed by user interface server subsystem 502 may be provided to content access subsystem 402 for further processing. For example, user interface server subsystem 502 may provide data representative of select elements of the web page to content access subsystem 402 for use by content access subsystem 402 in generating the tailored user interface, or, if user interface server subsystem 502 generates the tailored user interface, user interface server subsystem 502 may provide data representative of the tailored user interface to content access subsystem 402 for display by a display device on a display screen.

To illustrate, user interface server subsystem 502 may detect a request for a web page provided by content access subsystem 402. The request may be detected in any suitable way, including by user interface server subsystem 502 receiving the request from content access subsystem 402 (e.g., user interface server subsystem 502 may include a proxy server between content access subsystem 402 and web server subsystem 404, or content access subsystem 402 may be configured to send the request to both web server subsystem 404 and user interface server subsystem 502) or from web server subsystem 404 (e.g., web server subsystem 404 may be configured to notify user interface server subsystem 502 the request). In response to the detection of the request for the web page, user interface server subsystem 502 may access web page computing code 110 representative of the web page. For example, user interface server subsystem 502 may request and receive the web page computing code 110 from web server subsystem 404. User interface server subsystem 502 may identify select elements of the web page from the web page computing code 110 and/or generate a tailored user interface that includes data representative of the select elements. User interface server subsystem 502 may then provide data representative of the select elements of the web page or the tailored user interface to content access subsystem 402 for further processing.

By offloading certain processing from content access subsystem 402 to user interface server subsystem 502, computing resources of content access subsystem 402 may be conserved.

Figure 6:
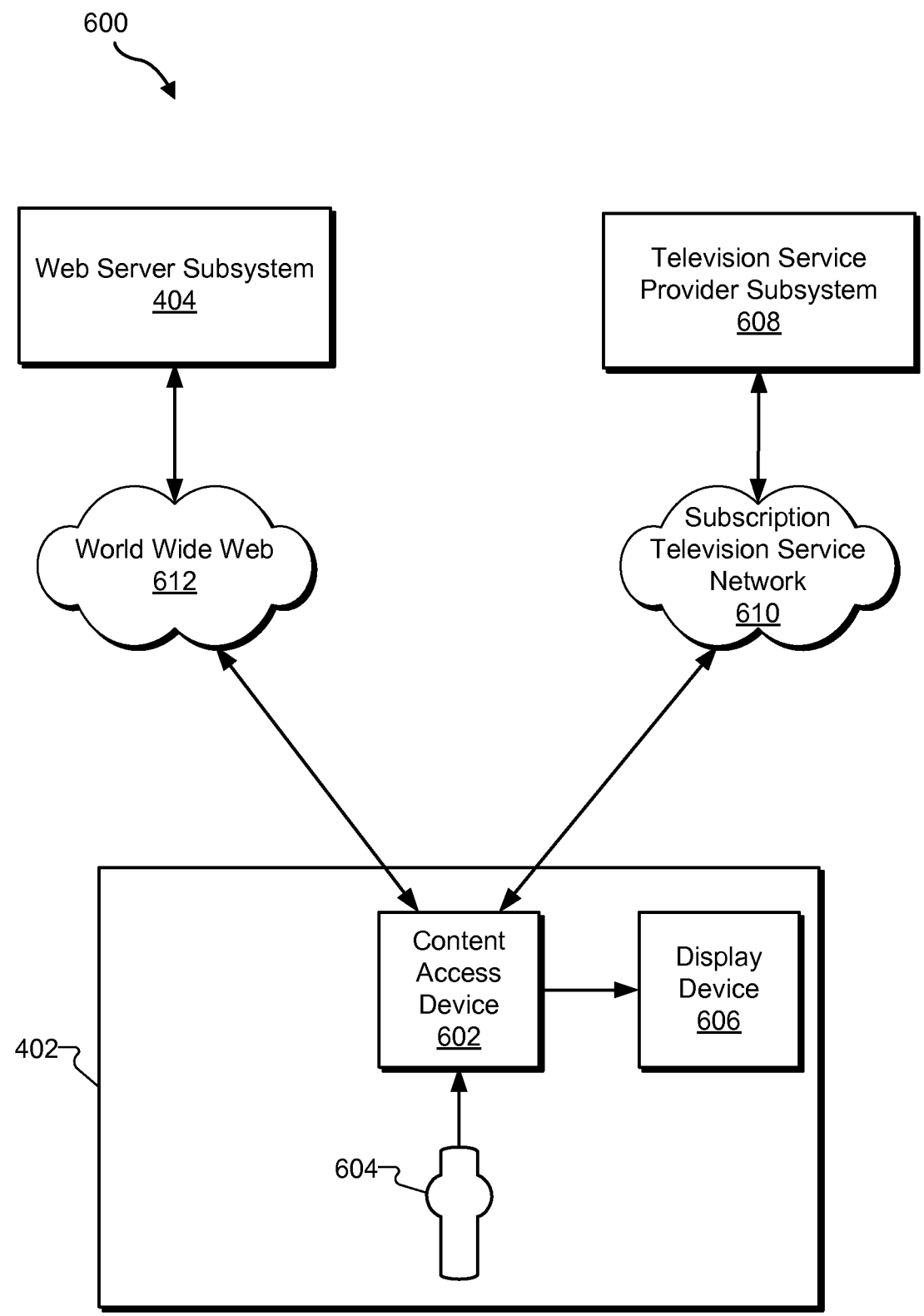
Figure 7:
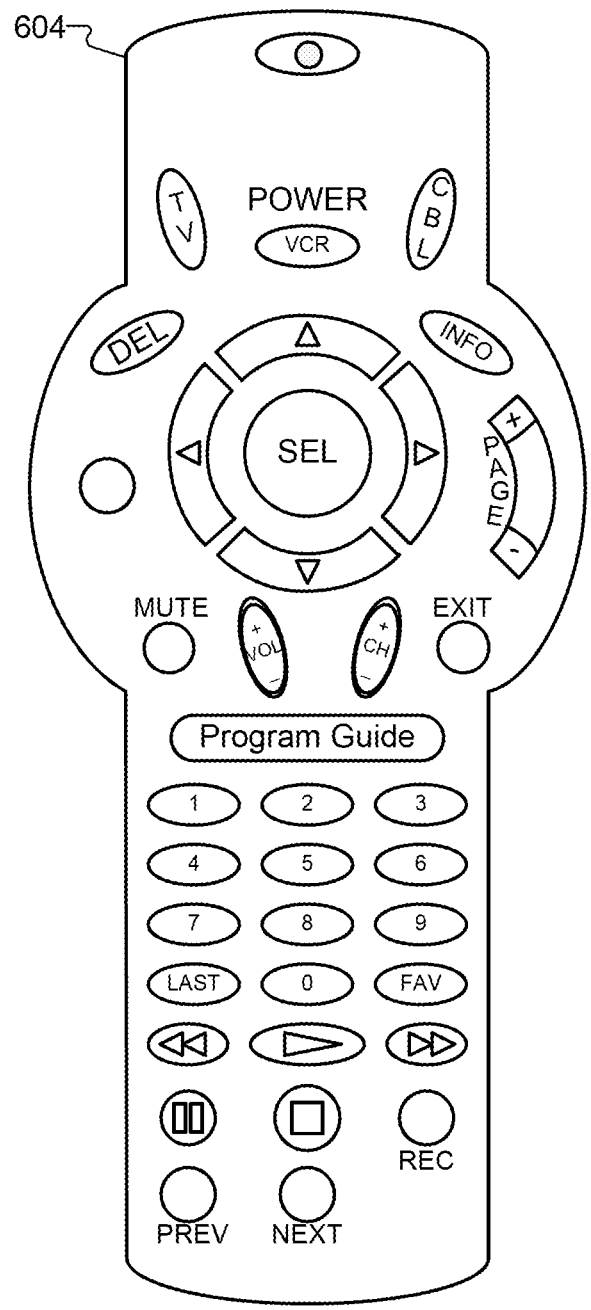
FIG. 7 illustrates an exemplary remote control device according to principles described herein.

FIG. 6 illustrates another exemplary implementation 600 of system 100. As shown in FIG. 6, implementation 600 may include content access subsystem 402, which may include a content access device 602 (e.g., a set-top box device) configured to receive user input commands from a remote control device 604 (e.g., an infrared remote control device) and provide display content to a display device 606 (e.g., a television) for display on a display screen. Content access device 602 may be configured to access media content (e.g., television programming content, video-on-demand content, pay-per-view content, and/or other content) distributed by a television service provider subsystem 608 by way of a subscription television service network 610. Content access device 602 may also be configured to access web content provided by web server subsystem 404 by way of the World Wide Web 612. For example, content access device 602 may access web page computing code 110 representative of a web page from web server subsystem 404 and perform any of the processing described herein to generate and provide a tailored user interface to display device 606 for display on a display screen. The tailored user interface may be tailored to facilitate convenient, easy, and/or intuitive interaction by a user utilizing remote control device 604 to provide user inputs included in a set of inputs provided by the remote control device 604. For example, FIG. 7 illustrates an exemplary remote control device 604 having a set of user input buttons implemented thereon. The buttons may correspond to a set of user inputs that the remote control device 604 is capable of providing to content access device 602 when the buttons are actuated by a user. The tailored user interface generated by content access device 602 may be tailored to facilitate interaction by the user utilizing the set of user inputs provided by the remote control device 604.

Figure 8:
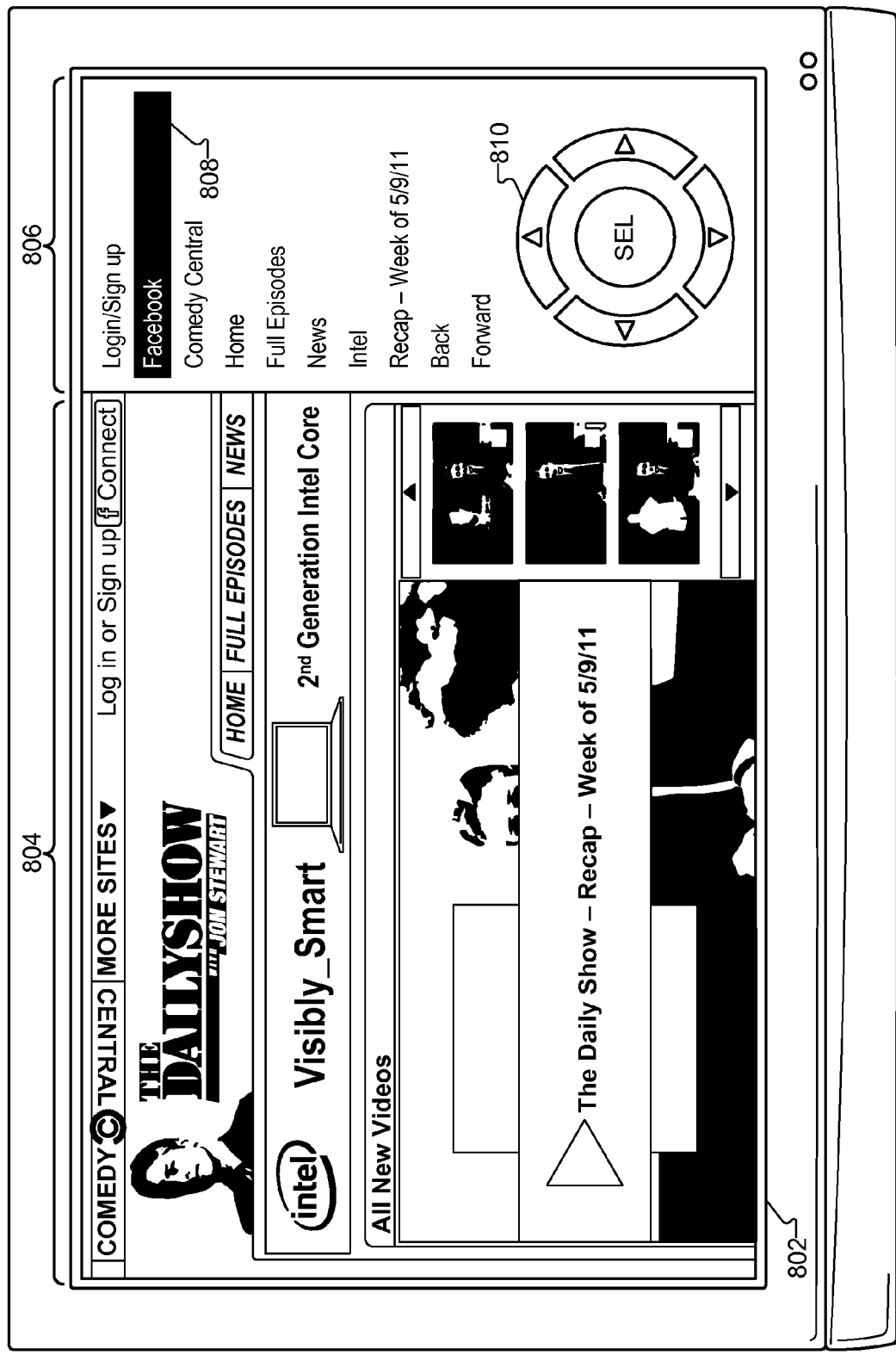
FIGS. 8-9 illustrate examples of tailored user interfaces and associated web pages displayed on a display screen according to principles described herein.
Figure 9:
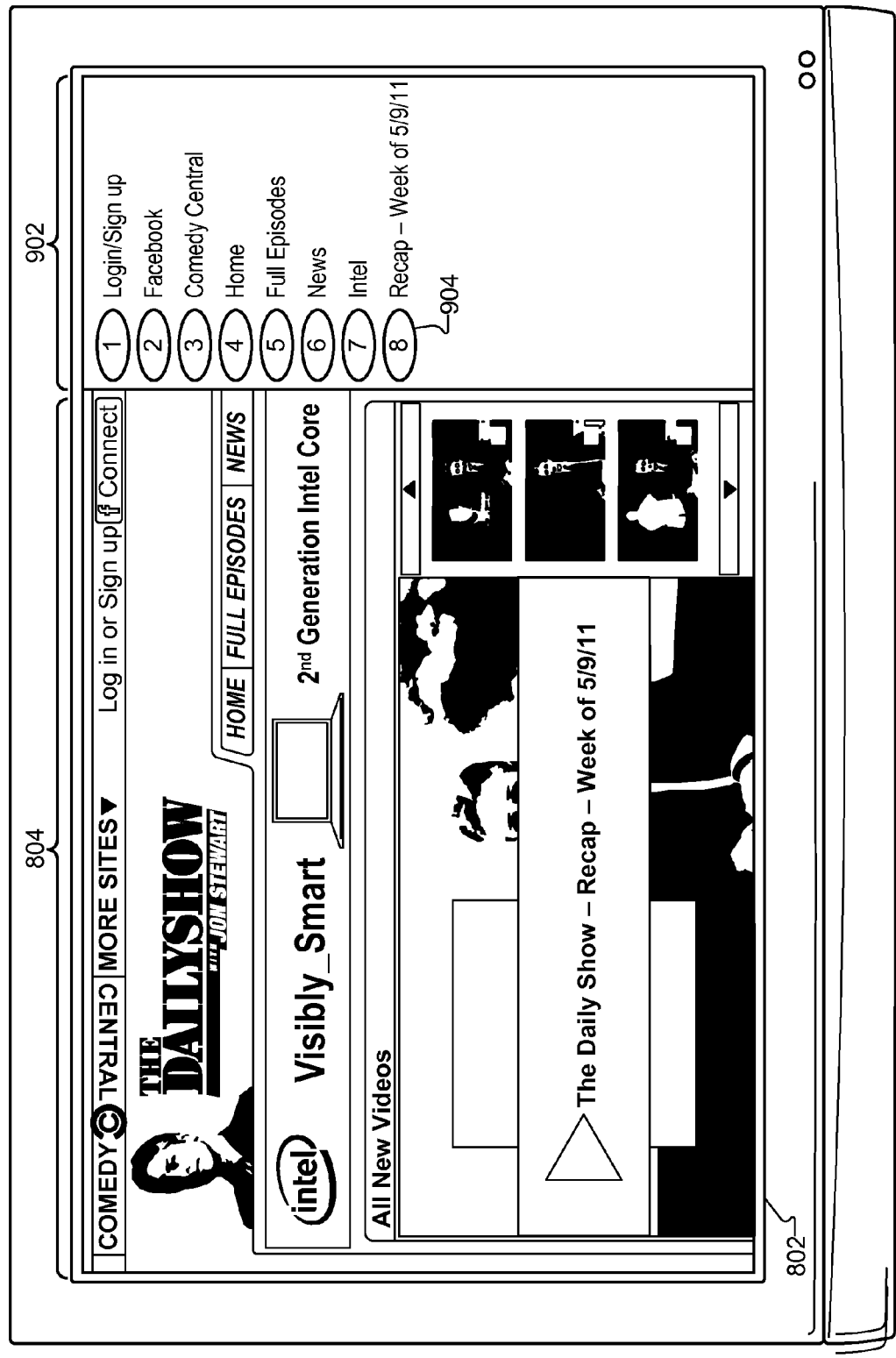

To illustrate, FIGS. 8-9 show examples of tailored user interfaces and associated web pages displayed on a display screen 802 of display device 606. The tailored user interfaces shown in FIGS. 8-9 are tailored to facilitate user input based on a set of user inputs provided by remote control device 604. In FIG. 8, a web page 804 associated with a television program known as "The Daily Show" is displayed on display screen 802. A tailored user interface 806 is also displayed on display screen 802 adjacent web page 804. As shown, tailored user interface 806 may include a list of selectable menu options that correspond to select elements of web page 804. The selectable menu options are arranged in a vertical, linear list that is intuitively and/or conveniently navigable by a user utilizing the up and/or down arrow buttons of the directional pad of remote control device 610. Accordingly, the user may provide input to move a selector 808 to a desired menu option and actuate the selection button of the directional pad of remote control device 610 to select the highlighted menu option.

As further shown in FIG. 8, tailored user interface 806 may include a graphical depiction 810 of the directional pad of remote control device 610. The graphical depiction 810 graphically indicates a set of user inputs that may be used to interact with tailored user interface 806.

In FIG. 9, a different tailored user interface 902 is displayed on display screen 802 adjacent web page 804. Tailored user interface 902 may be tailored to facilitate user interface based on a different set of user inputs provided by remote control device 610. As shown, tailored user interface 902 may include a list of selectable menu options that correspond to select elements of web page 804. The selectable menu options are arranged in a vertical, linear list. Tailored user interface 902 further includes a graphical depiction 904 of a set of user inputs that may be used to select the selectable menu options. In the illustrated example, the graphical depiction 904 indicates, next to each entry in the menu, a particular button of remote control device 610 that may be actuated by the user to select the corresponding menu option. As shown, the buttons may include numerical buttons included in a numerical keypad of remote control device 610. Accordingly, tailored user interface 902 is tailored to facilitate user interface based on a numerical keypad set of user inputs provided by remote control device 610.

An example of a user accessing a tailored user interface, such as those shown in FIGS. 8-9, will now be described. A user may use content access device 602 to access and watch television programming such as an episode of the television program known as the "The Daily Show." Near the end of the episode, the television programming may include an announcement that web content related to the episode and/or television program may be accessed as a particular website. Content access device 602 may communicate with web server subsystem 404 to request access to the website. Content access device 602 may aware of the URL for the website in any suitable way, such as by receiving the URL from television service provider subsystem 608, by the user inputting the URL, or by the URL having been preprogrammed into content access device 602, for example. In response to the request, web server subsystem 404 may provide and content access device 602 may receive computing code representative of a web page associated with the website. Content access device 602 may perform one or more operations as described herein to generate and provide the web page and a tailored user interface associated with the web page for display of display device 606. Accordingly, the user may be able to access web content related to a television program and intuitively, conveniently, and/or easily navigate the web content through a tailored user interface.

Figure 10:
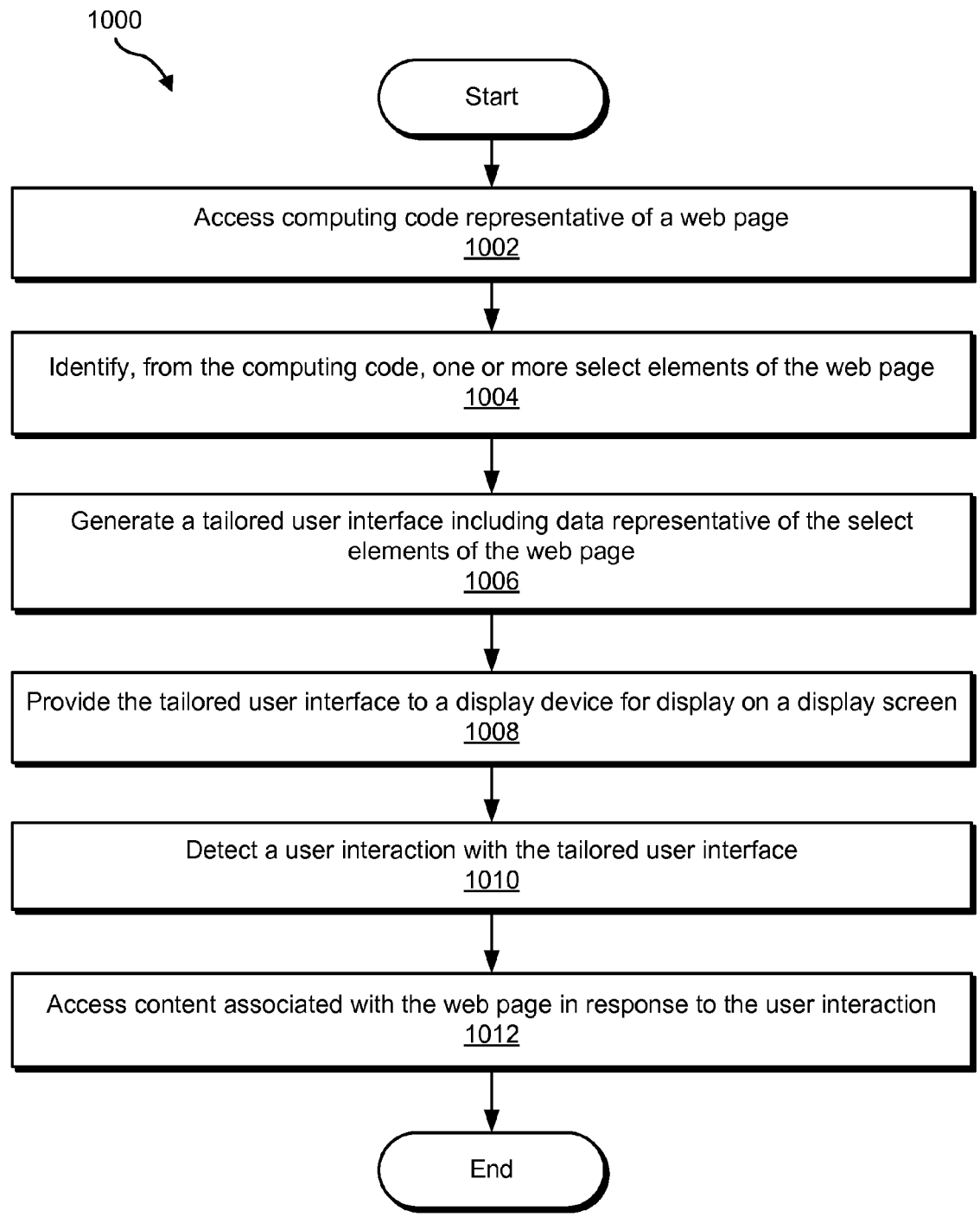
FIG. 10 illustrates an exemplary method of providing a tailored user interface associated with a web page according to principles described herein.

FIG. 10 illustrates an exemplary method 1000 of providing a user interface associated with a web page. While FIG. 10 illustrates exemplary steps according to one embodiment, other embodiments may omit, add to, reorder, combine, repeat, and/or modify any of the steps shown in FIG. 10. The steps shown in FIG. 10 may be performed by any component or combination of components of system 100 and/or one or more devices implementing system 100.

In step 1002, computing code representative of a webpage may be accessed, such as described herein.

In step 1004, one or more select elements of the webpage may be identified from the computing code representative of the webpage, such as described herein.

In step 1006, a tailored user interface including data representative of the select elements of the webpage may be generated, such as described herein.

In step 1008, the tailored user interface may be provided to a display device for display on a display screen, such as described herein.

In step 1010, a user interaction with the tailored user interface may be detected. For example, a user selection of data representative of a select element of the webpage may be detected in the tailored user interface.

In step 1012, content associated with the webpage may be accessed in response to the user interaction in step 1010. For example, content associated with an element of the webpage that is associated with a menu option in the tailored user interface that was selected in step 1010 may be accessed, such as described herein.

One or more of the steps shown in FIG. 10 may be repeated. For example, one or more of the steps shown in FIG. 10 may be repeated for another web page, as described above.

In certain embodiments, one or more of the components and/or processes described herein may be implemented and/or performed by one or more appropriately configured computing devices (e.g., one or more communication devices). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
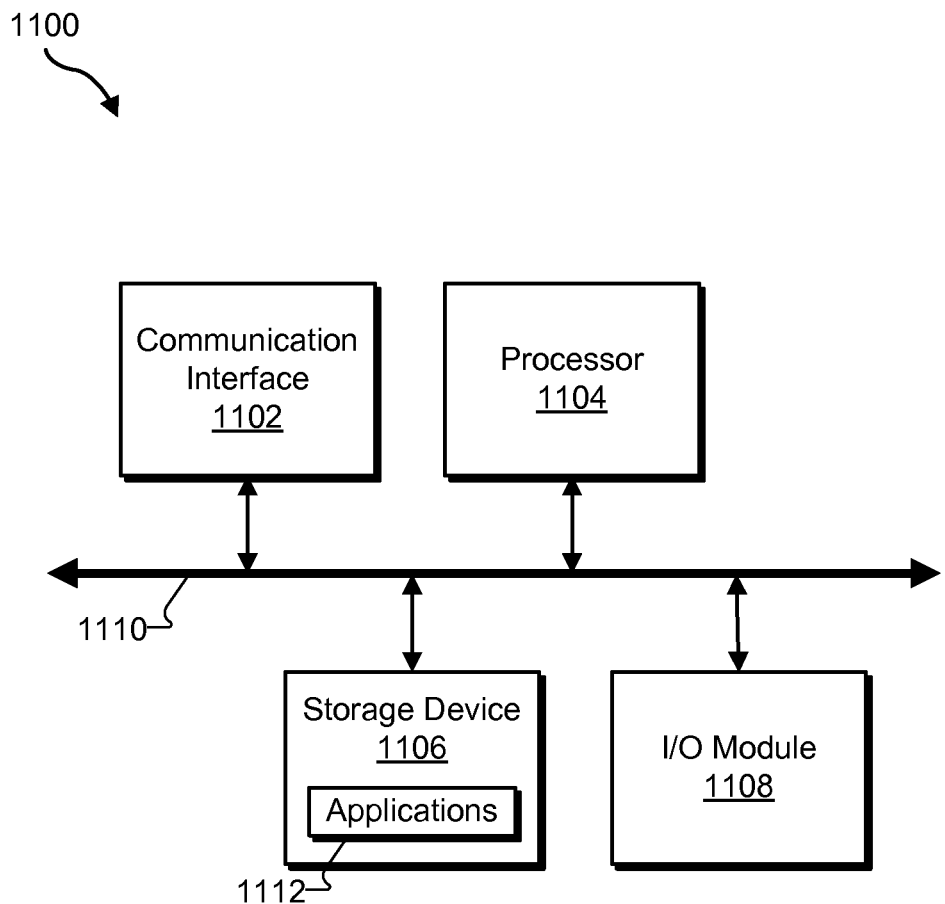
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a communications medium interface, a modem, and any other suitable interface. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with communication facility 102, element selection facility 104, and/or user interface facility 106. Likewise, storage facility 108 may be implemented by or within storage device 1106.

While certain examples described herein are directed to providing tailored user interfaces for web pages, this is illustrative only. In other examples, one or more of the principles described herein may be similarly applied to provide tailored user interfaces for other display pages configured to be displayed by a display device. For example, a tailored user interface may be provided for a display page that may be generated by a software application for display in a graphical user interface. To this end, system 100 may access code representative of the display page (e.g., through a application program interface), parse the code to detect elements of the display page, select one or more of the elements, and generate a tailored user interface that includes data representative of the one or more select elements, as described herein.

Tailored user interfaces, such as those described herein, may be used for any suitable application. For example, a tailored user interface may be used as an interstitial overlay to other content (e.g., web content or other content such as television programming content received from a television service provider), as interactive bumpers positioned around primary content, and/or to provide filtered versions of content (e.g., to provide television appropriate content by filtering out inappropriate content ahead of access a full website).

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

identifying, by a user interface computing system from computing code representative of a web page and based on a predefined element selection heuristic, one or more select elements of the web page, the one or more select elements of the web page including a link element of the web page;

generating, by the user interface computing system, a user interface including data representative of the one or more select elements for display on a display screen, the user interface having a presentation scheme that is different from a presentation scheme of the web page and that is tailored to facilitate interaction with the data representative of the one or more select elements including the link element by a user utilizing a set of user inputs that are positioned on a surface of a television remote control device, the tailored user interface including a graphical depiction of only a subset of the set of user inputs that are positioned on the surface of the television remote control device, the graphical depiction of the subset comprising a graphical depiction of each of a plurality of directional arrow buttons and a selection button that are positioned on the surface of the television remote control device;

providing, by the user interface computing system, an actual rendering of the web page to a display device for display on a display screen, wherein the actual rendering of the web page includes each of the identified one or more select elements arranged at their respective native positions within the actual rendering of the web page; and providing, by the user interface computing system, the tailored user interface to the display device for display together with the actual rendering of the web page on the display screen.

2. The method of claim 1, wherein the one or more select elements comprise a subset of elements of the web page.

3. The method of claim 1, wherein the tailored user interface does not include at least one of a structural property, an appearance property, and a style property of the web page.

4. The method of claim 1, wherein the data representative of the one or more select elements included in the tailored user interface comprises at least one of graphical and functional copies of the one or more select elements of the web page.

5. The method of claim 1, wherein the data representative of the one or more select elements included in the tailored user interface comprises a menu of one or more shortcuts to content accessible by way of the one or more select elements of the web page and including the content accessible by way of the link element.

6. The method of claim 5, wherein the content accessible by way of the one or more select elements of the web page comprises at least one of media content and one or more other web pages.

7. The method of claim 5, further comprising:
  detecting, by the user interface computing system, a user selection of a shortcut included in the menu of shortcuts and representative of the link element; and
  accessing, by the user interface computing system in response to the user selection, the content accessible by way of the link element.

8. The method of claim 1, wherein the computing code representative of the web page comprises markup language code.

9. The method of claim 1, wherein the identifying further comprises:
  parsing the computing code representative of the web page to detect elements of the web page; and
  selecting, from the detected elements of the web page and based on the predefined element selection heuristic, the one or more select elements of the web page for inclusion in the tailored user interface.

10. The method of claim 1, wherein the predefined element selection heuristic specifies one or more conditions to be used by the user interface computing system to identify the one or more select elements from elements of the web page.

11. The method of claim 10, wherein the one or more conditions specify one or more types of web page elements to be selected by the user interface computing system for inclusion in the tailored user interface.

12. The method of claim 11, wherein the one or more types of web page elements comprise at least one of navigational elements and media content link elements.

13. The method of claim 1, embodied as computer-executable instructions on at least one non-transitory computer-readable medium.

14. The method of claim 1, wherein the television remote control device controls at least one of a television device, a set-top box device, and a digital video recording device.

15. The method of claim 1, wherein the one or more select elements further include an embedded interactive element that comprises an embedded media player element.

16. The method of claim 1, wherein the identifying of the one or more select elements of the web page further includes accessing information associated with the link element by following the link element and determining a type of the link element based on the content accessible by way of the link element.

17. The method of claim 16, wherein the generating of the user interface further includes generating a text descriptor for the link element based on the determined type of the link element.

18. The method of claim 1, wherein:
  the identifying of the one or more select elements of the web page further includes following the link element to access descriptive information associated with the link element; and
  the generating of the user interface further includes generating a text descriptor for the link element based on the accessed descriptive information, the text descriptor descriptive of content accessible by way of the link element.

19. The method of claim 18, wherein:
  the link element included in the web page is represented by text; and
  the generating of the user interface further includes replacing the text representing the link element in the web page with the text descriptor in the user interface.

20. The method of claim 19, wherein the text descriptor includes more descriptive information regarding the link element than is provided by the text representing the link element in the web page.

21. The method of claim 1, wherein a presentation order of each of the identified one or more select elements included within the actual rendering of the web page matches a presentation order of the data representative of the one or more select elements included in the tailored user interface.

22. A method comprising:
  accessing, by a user interface computing system, computing code representative of a display page;
  parsing, by the user interface computing system, the computing code representative of the display page to detect elements of the display page;
  selecting, by the user interface computing system from the detected elements of the display page, one or more select elements of the display page, the one or more select elements of the display page including a link element of the display page, the selecting of the one or more select elements of the display page including accessing information associated with the link element;
  generating, by the user interface computing system, a user interface including data representative of the one or more select elements, the user interface having a presentation scheme that is different from a presentation scheme of the display page and that is tailored to facilitate interaction with the data representative of the one or more select elements including the link element by a user utilizing a set of user inputs that are positioned on a surface of a television remote control device, the generating of the tailored user interface further including generating a text descriptor for the link element based on the accessed information, the text descriptor descriptive of content accessible by way of the link element, the tailored user interface including a graphical depiction of only a subset of the set of user inputs that are positioned on the surface of the television remote control device, the graphical depiction of the subset comprising a graphical depiction of each of a plurality of directional arrow buttons and a selection button that are positioned on the surface of the television remote control device;
  providing, by the user interface computing system, an actual rendering of the display page to a display device for display on a display screen, wherein the actual rendering of the display page includes each of the selected one or more select elements of the display page arranged at their respective native positions within the actual rendering of the web page;

providing, by the user interface computing system, the tailored user interface to the display device for display together with the actual rendering of the display page on the display screen;

detecting, by the user interface computing system, a user interaction associated with the text descriptor included in the tailored user interface; and accessing, by the user interface computing system in response to the user interaction, the content accessible by way of the link element.

23. The method of claim 22, wherein the display page comprises a web page.

24. The method of claim 22, wherein the tailored user interface does not include at least one of a structural property, an appearance property, and a style property of the display page.

25. The method of claim 22, embodied as computer-executable instructions on at least one non-transitory computer-readable medium.

26. A system comprising:
at least one physical computing device including a processor;
an element selection facility that is communicatively coupled to the processor and that directs the processor to identify, from computing code representative of a web page and based on a predefined element selection heuristic, one or more select elements of the web page, the one or more select elements of the web page including a link element of the web page; and
a user interface facility that is communicatively coupled to the element selection facility and that directs the processor to
generate a user interface including data representative of the one or more select elements for display on a display screen, the user interface having a presentation scheme that is different from a presentation scheme of the web page and that is tailored to facilitate interaction with the data representative of the one or more select elements including the link element by a user utilizing a set of user inputs that are positioned on a surface of a television remote control device, the tailored user interface including a graphical depiction of only a subset of the set of user inputs that are positioned on the surface of the television remote control device, the graphical depiction of the subset comprising a graphical depiction of each of a plurality of directional arrow buttons and a selection button that are positioned on the surface of the television remote control device;
provide an actual rendering of the web page to a display device for display on a display screen, the actual rendering of the web page including each of the one or more select elements arranged at their respective native positions within the actual rendering of the web page; and
provide the tailored user interface to the display device for display together with the actual rendering of the web page on the display screen.

27. A method comprising:
identifying, by a user interface computing system from computing code representative of a web page and based on a predefined element selection heuristic specifying at least one element type condition, one or more select elements of the web page that are of at least one type indicated by the at least one element type condition;
generating, by the user interface computing system, a user interface including data representative of the one or more select elements for display on a display screen, the user interface having a presentation scheme that is different from a presentation scheme of the web page and that is tailored to facilitate interaction with the data representative of the one or more select elements by a user utilizing a set of user inputs positioned on a surface of a remote control device associated with a content access device, the tailored user interface including a graphical depiction of only a subset of the set of user inputs that are positioned on the surface of the remote control device, the graphical depiction of the subset comprising a graphical depiction of each of a plurality of directional arrow buttons and a selection button that are positioned on the surface of the remote control device; and
displaying, by the user interface computing system, an actual rendering of the web page according to the presentation scheme of the web page together with the user interface on a television display device, the actual rendering of the web page including each of the identified one or more select elements currently displayed in the web page and arranged at their respective native positions within the actual rendering of the web page, the displaying of the user interface including positioning the user interface adjacent to the actual rendering of the web page on the television display device and including displaying each of the identified one or more select elements of the at least one type indicated by the at least one element type condition specified by the predefined element selection heuristic, the identified one or more select elements included in the user interface selectable by the user of the remote control device via a graphical selector displayed in the user interface.

28. The method of claim 27, wherein the graphical selector is configured to be moved between the one or more select elements in the display of the user interface based on user input via a directional pad on the remote control device.

29. The method of claim 27, wherein the one or more select elements of the web page of the at least one type include at least one of a navigational element, an embedded media player element, a primary navigational element, and a non-primary navigational element.

* * * * *